United States Patent [19]

Hosokawa et al.

[11] Patent Number: 5,118,788

[45] Date of Patent: Jun. 2, 1992

[54] PROCESS FOR PREPARING POLYTETRAFLUOROETHYLENE POWDER

[75] Inventors: Kazutaka Hosokawa; Tetsuo Shimizu; Kazuo Ishiwari; Noriyasu Yamane, all of Settsu, Japan

[73] Assignee: Daikin Industries Ltd., Osaka, Japan

[21] Appl. No.: 696,194

[22] Filed: May 6, 1991

[30] Foreign Application Priority Data

May 14, 1990 [JP] Japan .................. 2-123832

[51] Int. Cl.$^5$ .................................................. C08F 6/00
[52] U.S. Cl. ...................................... 528/503; 526/255
[58] Field of Search ............................................. 528/503

[56] References Cited

U.S. PATENT DOCUMENTS

| 2,847,711 | 8/1958 | Hibbard ............................. 528/503 |
| 4,675,380 | 6/1987 | Buckmaster et al. . |
| 4,714,756 | 12/1987 | Buckmaster ....................... 528/503 |

FOREIGN PATENT DOCUMENTS

| 671689 | 10/1965 | Belgium . |
| 39-1810 | 2/1964 | Japan ................................. 528/503 |
| 828719 | 2/1960 | United Kingdom . |
| 1017749 | 1/1966 | United Kingdom ............... 528/503 |
| 1060764 | 3/1967 | United Kingdom ............... 528/503 |
| 1100388 | 1/1968 | United Kingdom ............... 528/503 |
| 1240883 | 7/1971 | United Kingdom ............... 528/503 |

OTHER PUBLICATIONS

Chemical Abstracts, vol. 78, No. 16, Apr. 23, 1973, p. 33, Abstr. No. 98466q.

Database WPI, Accession No. 73-075104, Derwent Publications Ltd., London, GB & SU-A-3427 779.

*Primary Examiner*—Joseph L. Schofer
*Assistant Examiner*—N. Sarofim
*Attorney, Agent, or Firm*—Birch, Stewart, Kolasch & Birch

[57] ABSTRACT

Polytetrafluoroethylene powder having an average particle size of 1 to 30 μm and a specific surface area of 2 to 6 m$^2$/g is prepared by heating unsintered polytetrafluoroethylene powder having a melting point of 313° to 330° C. at a temperature in a range from a temperature 70° C. lower than the melting point to a temperature lower than the melting point and comminuting the heated powder.

11 Claims, No Drawings

PROCESS FOR PREPARING POLYTETRAFLUOROETHYLENE POWDER

BACKGROUND OF THE INVENTION

1. Field of the Invention

The present invention relates to a process for preparing polytetrafluoroethylene powder.

2. Description of the Related Art

Polytetrafluoroethylene including a copolymer of tetrafluoroethylene and 1% by weight or less of a comonomer (hereinafter referred to as "PTFE") is blended with other thermoplastic resins, thermosetting resins, elastomers, paints, inks, greases, oils and the like to improve their properties by using the good properties of PTFE such as heat resistance, flame retardance, non-tackiness, low friction properties, chemical resistance, etc.

PTFE powder, which is most widely used for blending, is a low molecular weight product which is referred to as a "wax" and which has a melting point of about 310° C. to 330° C. PTFE powder used for usual molding is a high molecular weight product having a melting point of higher than 330° C.

From a view point of a particle shape of the additive wax powder, PTFE powder is classified into agglomerated powder of submicron order particles and densified powder which has once been molten. The agglomerated powder has an average particle size of 2 to 100 $\mu$m and a specific surface area of 9 m$^2$/g or larger, while the densified powder has an average particle size of 2 to 50 $\mu$m and a specific surface area of about 2 to 6 m$^2$/g.

As disclosed in Japanese Patent Publication Nos. 22043/1982 and 25275/1976, a process for preparing a wax of agglomerated PTFE powder comprises emulsion polymerizing tetrafluoroethylene in the presence of a chain transfer agent to obtain a low molecular weight PTFE, coagulating an aqueous dispersion of colloidal PTFE and drying coagulated PTFE to obtain powder.

Since the PTFE powder obtained by the above process comprises agglomerates of colloidal particles, it can be advantageously dispersed to submicron order particles, while it cannot exhibit inherent friction characteristics of PTFE when it is used as an additive for a material in which a particle size of 5 to 20 $\mu$m is required, for example, ink, since the agglomerates are broken.

When such PTFE powder is blended in some engineering plastics, the particles are poorly dispersed.

In the above applications, in particular, the densified PTFE powder is used.

For the production of densified PTFE powder, there is known a process comprising pyrolysing high molecular weight PTFE to decrease a molecular weight (cf. Japanese Patent Publication Nos. 15506/1975 and 20970/1963). However, this process has some drawbacks. That is, since a raw material PTFE is expensive, scraps such as swarfs are often used, so that impurities such as foreign particles tend to be contained in the product. Since liquid and gas by-products are always generated in the pyrolysis step, this process is uneconomical. The formation of hydrogen fluoride, which is a cause of corrosion of a pyrolysis apparatus, is unavoidable. In addition, since a product of pyrolysis is a dense bulk, it should be comminuted to a desired particle size.

However, it is not easy to comminute once molten PTFE. To achieve fine comminution, the molecular weight of PTFE is decreased. But, decrease of the molecular weight increases an amount of volatile components uneconomically.

Other process for preparing densified PTFE powder comprises comminuting a molded article which has been once molten by irradiation according to a method for decomposing high molecular PTFE by the irradiation (cf. Japanese Patent Publication Nos. 25419/1977 and 48671/1974). However, this process is not necessarily advantageous in view of apparatuses and costs. Even by this process, the impurities such as foreign particles tend to be contained in the product when the scraps are used as a raw material of PTFE.

As a process for producing densified PTFE particles containing less impurities, there is known a process comprising heating the above agglomerated powder at a temperature higher than the melting point of PTFE to melt the agglomerated powder, cooling and comminuting the heated powder. Since the PTFE powder is heated at a temperature higher than the melting point of PTFE, a large amount of volatile materials including low molecular weight polymers are generated, and the process economy is poor. Since the densified bulks are also produced in this process, PTFE should have an extremely low molecular weight or the agglomerated powder should be comminuted by a special technique such as freeze-comminution so as to obtain fine powder.

SUMMARY OF THE INVENTION

An object of the present invention is to provide a process for preparing densified particle type PTFE powder with high purity which is useful as an modifier for improving sliding properties, non-tackiness, flame-retardance, stain proofness, chemical resistance and the like of thermoplastic resins, thermosetting resins, inks, paints, elastomers, etc.

According to the present invention, there is provided a process for preparing PTFE powder having an average particle size of 1 to 30 $\mu$m and a specific surface area of 2 to 6 m$^2$/g, which comprises heating unsintered PTFE powder having a melting point of 313° to 330° C. at a temperature in a range from a temperature 70° C. lower than the melting point to a temperature lower than the melting point and comminuting the heated powder.

DETAILED DESCRIPTION OF THE INVENTION

In the present invention, the term "polytetrafluoroethylene (PTFE)" is intended to include not only a homopolymer of tetrafluoroethylene but also a copolymer of tetrafluoroethylene with 1% or less of at least one comonomer.

The unsintered PTFE to be used in the present invention may be prepared by coagulating an aqueous dispersion of colloidal PTFE and drying coagulated PTFE powder. For example, the aqueous dispersion of colloidal PTFE may be prepared by polymerizing tetrafluoroethylene and optionally at least one comonomer at a temperature of 10° to 120° C. under pressure of 6 to 40 kg/cm$^2$ in an aqueous medium containing 0.03 to 1% by weight of a water-soluble fluorine-containing dispersant of the formula:

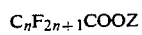

or

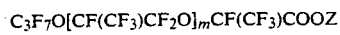

wherein Z is NH$_4$ or an alkali metal, n is an integer of 6 to 9, and m is 1 or 2,
in the presence of, as a polymerization initiator, a water-soluble organic or inorganic peroxide such as peroxydisuccinic acid or a persulfate or a combination of the water-soluble organic or inorganic peroxide and a reducing agent.

Specific examples of the comonomers are selected from a compound of the formula:

$$A(CF_2)_xO_yCF=CF_2$$

wherein A is a hydrogen atom, a chlorine atom or a fluorine atom, x is an integer of 1 to 6 and y is 0 or 1; a compound of the formula:

$$C_3F_7O[CF(CF_3)CF_2O]_pCF=CF_2$$

wherein p is 1 or 2; chlorotrifluoroethylene (CTFE), vinylidene fluoride (VdF), trifluoroethylene (TrFE), etc.

If necessary, a chain transfer agent such as a hydrocarbon or a halogenated hydrocarbon (e.g. methane, ethane, chloromethane, dichloromethane, etc.) may be used.

It may be preferred to modify PTFE with other fluorine-containing olefin so as to promote fusion bonding of the particles. However, if an amount of the comonomer is too large, the particles are excessively fusion bonded so that the fine powder may not be obtained in the subsequent comminution step. Then, the amount of the comonomer is less than 1% by weight, preferably from 0.1 to 1% by weight based on the weight of the polymer.

The melting point of PTFE as produced by the polymerization reaction is adjusted in a range between 313° C and 330° C., preferably between 318° C. and 328° C.

When the melting point of PTFE is lower than the above lower limit, the particles after comminution are too soft and a large amount of volatile components are generated in the heating step. When the melting point of PTFE is higher than the above upper limit, it is difficult to fusion bond the PTFE particles at a temperature lower than the melting point, which is one of the characteristics of the present invention.

The colloidal PTFE particles to be produced have an average particle size of from 0.05 to 0.5 μm, and a solid content in the aqueous dispersion of the PTFE particles is from 10 to 40% by weight based on the weight of the aqueous medium. The prepared aqueous dispersion of the colloidal PTFE particles is removed from an autoclave and subjected to coagulation and drying.

The coagulation is carried out by stirring the dispersion more vigorously than in the polymerization reaction, if necessary, after adjusting pH of the aqueous dispersion from neutral to alkaline. The coagulation may be carried out with the addition of a coagulating agent such as a water-soluble organic compound (e.g methanol, acetone, etc.), an inorganic salt (e.g. potassium nitrate, ammonium carbonate, etc.) or an inorganic acid (e.g. hydrochloric acid, sulfuric acid, nitric acid, etc.).

The coagulated powder is dried in air or under reduced pressure usually at a temperature of from 80° to 200° C. At this stage, the PTFE powder is in such state that the colloidal particles are agglomerated, so that the specific surface area is usually from 9 to 20 m$^2$/g.

A method for heating the obtained PTFE powder is not limited. For example, the PTFE powder may be accumulated to a suitable depth and heated in a conventional batch type or continuous type electric furnace with hot air circulation. The heating temperature is from a temperature 70° C. lower than the melting point and a temperature just below the melting point, preferably from a temperature 50° C. lower than the melting point to a temperature just below the melting point.

The PTFE powder having a relatively high melting point is preferably heated at a temperature closer to the melting point. However, the heating temperature should be lower than the melting point. If the PTFE powder is heated at the melting point or higher, it is difficult to reduced the particle size or each particle shape tends to become whisker-like. When the PTFE powder is heated at a too low temperature, the particles are not fusion bonded to a necessary extent and not densified, so that the specific surface area is not decreased.

The PTFE powder is heated for a period of time sufficient for decreasing the specific surface area to a desired range. In general, the PTFE powder is heated for 1 to 120 minutes after the powder temperature reaches the above heating temperature.

A heating atmosphere is preferably air or an inert gas. In particular, when the polymer chain ends are to be treated, the powder can be heated in an atmosphere of molecular fluorine, a halogenated fluoride (e.g. ClF, ClF$_3$, ClF$_5$, BrF, BrF$_3$, BrF$_5$, IF$_3$, IF$_5$, IF$_7$, etc.), a fluoride of a rare gas (e.g. XeF$_2$, XeF$_4$, XeF$_6$, KrF$_2$, etc.) or a nitrogen-containing fluorine compound (e.g. NF$_3$, NF$_2$, N$_2$F$_4$, N$_2$F$_2$, N$_3$F, etc.).

When the heated PTFE powder is comminuted, it has an average particle size of 1 to 30 μm and a specific surface area of 2 to 6 m$^2$/g.

According to the present invention, the PTFE particles are sufficiently fusion bonded to each other by the heat treatment at a temperature lower than the melting point of PTFE and the specific surface area of the PTFE powder can be decreased. Further, in the process of the present invention, a smaller amount of volatile components are generated by the heat treatment, and comminutability of the powder is better than PTFE powder which has been heated at a temperature not lower than the melting point of PTFE.

PREFERRED EMBODIMENTS OF THE INVENTION

The present invention will be illustrated by following Examples.

In Examples, the measurements, tests and treatments are carried out as follows:

1. Measurement of melting point

A PTFE sample is analyzed by a differential scanning calorimeter, and a temperature corresponding to a peak assigned to crystalline melting is defined as a melting point.

A used calorimeter is the 1090 Thermal Analyzer (manufactured by duPont), and the measurement is done with 3.0 mg of the sample at a heating rate of 10° C./min. in a temperature range between 200° to 380° C.

2. Measurement of specific surface area of powder

According to the BET method, a specific surface area of a PTFE powder sample is measured using MONOSORB (manufactured by QUANTA CHROME).

As a carrier gas, a mixed gas of 30% of nitrogen and 70% of helium is used, and the apparatus is cooled with liquid nitrogen. A sample amount is 2 g, and three measured values are averaged.

3. Heat treatment

A polymer powder sample is filled in a vat to a depth of about 2 cm, placed in a hot-air circulation type electric furnace which has been heated at a treating temperature and kept at a constant temperature. A heating time is measured from a time at which the powder temperature reaches the treating temperature. The heating atmosphere is air.

After heating at a predetermined temperature for a predetermined time, the furnace temperature is lowered to 150° C. at a cooling rate of 10° C./min. Then, the powder sample is removed from the furnace.

4. Comminution

A PTFE powder is comminuted by the Rotor Speed Mill P-14 (manufactured by Flitche) at room temperature at a rotor speed of 20,000 rpm and then sieved through a screen of 0.08 mm openings.

5. Volatile components

A polymer sample (10 g) is filled in an aluminum cup (a content of 50 ml, an upper diameter of 61 mm, a bottom diameter of 42 mm and a depth of 33 mm), placed in a hot-air circulation type electric furnace which has been heated at a treating temperature and kept at the treating temperature $\pm 3°$ C for a predetermined time. Then, the sample weight is measured and an amount of volatile components is calculated according to the following equation:

$$\text{Volatile components (wt \%)} = \frac{10 - \text{weight after heating}}{10} \times 100$$

6. Average particle size of powder

A polymer powder sample is dispersed in a 2% aqueous solution of $C_7F_{15}COONH_4$ by the application of ultrasonic, and an average particle size is measured by a natural sedimentation method with CAPA 500 (manufactured by Kabushikikaisha Horiba Seisakusho).

EXAMPLE 1

In a stainless steel (SUS 316) 6 liters autoclave equipped with anchor type agitation blades and a temperature regulating jacket, deionized water (2960 ml) and ammonium perfluoroocatanoate (1.9 g) were charged, and an internal atmosphere was replaced with nitrogen gas (three times) and tetrafluoroethylene (TFE) (two times) to remove oxygen while keeping an internal temperature at 70° C. Thereafter, methyl chloride (30 g) and hexafluoropropylene (HFP) (2.0 g) were charged, TFE was injected to increase internal pressure to 7.0 kg/cm$^2$G, and the content in the autoclave was stirred at 250 rpm, 70° C.

Then, an aqueous solution of ammonium persulfate (APS) (2.25 g) in water (40 ml) was injected by pressurizing with TFE to increase the internal pressure to 8.0 kg/cm$^2$G. A polymerization reaction proceeded at an accelerated rate. A reaction temperature was kept at 70° C, and the reaction mixture was stirred at 250 rpm.

During the polymerization reaction, TFE was continuously added to keep the internal pressure at 8.0 kg/cm$^2$G.

When 450 g of TFE was consumed after the addition of the polymerization initiator, the supply of TFE and stirring were stopped, the internal gas was discharged to atmospheric pressure, and the content was recovered from the autoclave to terminate the polymerization reaction.

A resulting aqueous dispersion of polytetrafluoroethylene was poured in a coagulation tank. The dispersion was stirred with adding ammonium carbonate to coagulate the polymer, which was dried at about 150° C. for 15 hours. Thereafter, a melting point of the resulting powder was measured to be 322° C.

A content of HFP in the polymer was 0.17% by weight. The content of HFP (% by weight) in the polymer was calculated by multiplying a ratio of an absorbance at 982 cm$^{-1}$ in an IR spectrum to that at 935 cm$^{-1}$ by 0.3.

The obtained polymer powder was heated in the hot-air circulating type electric furnace at a powder depth of about 2 cm and comminuted to obtain densified powder.

The results are shown in Table 1.

When 20% by weight of the obtained polymer powder was blended with polyphenylene sulfide (Fortron 1140 Al manufactured by Polyplastics), the powder had good dispersibility.

The heat treatment was carried out using a continuous kneading machine (S-1 KRC Kneader manufactured by Kurimoto Tekkosho) at 270° C. with a residence time of 2 minutes, and the powder was comminuted to obtain powder having an average particle size of 11 $\mu$m and a specific surface area of 2.0 m$^2$/g.

EXAMPLES 2-5

In the same manner as in Example 1 but employing the polymerization conditions and the heating conditions as shown in Table 1, the polymer powder was prepared.

The results are also shown in Table 1.

The content of perfluoropropyl vinyl ether in Example 3 was calculated by multiplying a ratio of an absorbance at 995 cm$^{-1}$ in an IR spectrum to that at 935 cm$^{-1}$ by 0.14.

COMPARATIVE EXAMPLE 1

Unsintered polytetrafluoroethylene powder having a melting point of 331° C. was heated at 325° C. for 2 hours and comminuted. A specific surface area of the obtained powder was not sufficiently decreased.

COMPARATIVE EXAMPLE 2

Unsintered polytetrafluoroethylene powder having a melting point of 312° C. was heated at 290° C. for 1 (one) hour. But, a large amount of volatile components were generated, and the powder was not economically suitable.

COMPARATIVE EXAMPLE 3

The unsintered polytetrafluoroethylene powder prepared in Example 1 was heated at 340° C. for 1 (one) hour. But, a large amount of volatile components were uneconomically generated, and comminuting properties of the powder were poor.

COMPARATIVE EXAMPLE 4

The unsintered polytetrafluoroethylene powder prepared in Example 1 was heated at 250° C. for 2 hours. But, a specific surface area of the powder was not sufficiently decreased.

The results of Comparative Examples are summarized in Table 2.

TABLE 1

| Example No. | Polymerization conditions ||||| Solid content in aqueous dispersion | Properties of powder after coagulation and drying ||||
|---|---|---|---|---|---|---|---|---|---|---|
| | Amount of emulsifier (g) | Reaction temp. (°C.) | Amount of APS (g) | Chain transfer agent (g) | Modifier (g) | | Content of modifier (wt. %) | Melting point (°C.) | Av. particle size (μm) | Specific surface area (m²/g) |
| 1 | 1.9 | 70 | 2.25 | CH₃Cl (30) | HFP (2.0) | 12.5 | 0.17 | 322 | 4.8 | 11 |
| 2 | 1.9 | 70 | 2.25 | ↑ (30) | — | 12.3 | — | 322 | 4.8 | 10 |
| 3 | 0.6 | 55 | 0.78 | ↑ (13) | PPVE (0.5) | 12.5 | 0.06 | 325 | 4.0 | 14 |
| 4 | 1.9 | 70 | 2.25 | CH₂Cl₂ | — | 12.8 | — | 318 | 4.0 | 15 |
| 5 | 0.6 | 55 | 0.78 | CH₃Cl | — | 13.0 | — | 328 | 5.6 | 11 |

| Example No. | Heating conditions ||| Powder after heating and drying ||
|---|---|---|---|---|---|
| | Temp. (°C.) | Time (hr) | Amount of volatiles (wt. %) | Av. particle size (μm) | Specific surface area (m²/g) |
| 1 | 290 | 1 | 0.7 | 4.5 | 5.5 |
| | 310 | 1 | 1.0 | 4.8 | 3.5 |
| | 320 | 1 | 1.8 | 10.8 | 2.5 |
| 2 | 310 | 1 | 0.8 | 4.8 | 5.5 |
| 3 | 320 | 1 | 0.4 | 5.0 | 5.6 |
| 4 | 270 | 1 | 0.9 | 4.3 | 5.5 |
| 5 | 320 | 1 | 0.3 | 5.6 | 6.0 |

TABLE 2

| Comp. Example No. | Unsintered PTFE powder ||| Heating conditions ||| Powder after heating and drying ||
|---|---|---|---|---|---|---|---|---|
| | Melting point (°C.) | Av. particle size (μm) | Specific surface area (m²/g) | Temp. (°C.) | Time (hr) | Amount of volatiles (wt. %) | Av. particle size (μm) | Specific surface area (m²/g) |
| 1 | 331 | 7.6 | 9 | 325 | 2 | 0.2 | 8.0 | 7.5 |
| 2 | 312 | 3.9 | 15 | 290 | 1 | 3.5 | 33 | 1.6 |
| 3 | 322 | 4.8 | 11 | 340 | 1 | 4.6 | 38 | 1.6 |
| 4 | 322 | 4.8 | 11 | 250 | 2 | 0.3 | 4.3 | 8.5 |

What is claimed is:

1. A process for preparing polytetrafluoroethylene powder having an average particle size of 1 to 30 μm and a specific surface area of 2 to 6 m²/g, which comprises heating unsintered polytetrafluoroethylene powder having a melting point of 313° to 330° C. at a temperature in a range from a temperature 70° C. lower than the melting point to a temperature lower than the melting point and comminuting the heated powder.

2. The process according to claim 1, wherein polytetrafluoroethylene contains 0.01 to 1.0% by weight of at least one comonomer.

3. The process according to claim 1, wherein said unsintered polytetrafluoroethylene has a melting point of from 318° to 328° C.

4. The process according to claim 1, wherein the heating is carried out in an atmosphere of air or an inert gas.

5. The process according to claim 2, wherein the comonomer is a compound of the formula:

$$A(CF_2)_xO_yCF=CF_2$$

wherein A is a hydrogen atom, a chlorine atom or a fluorine atom, x is an integer of 1 to 6 and y is 0 or 1.

6. The process according to claim 2, wherein the comonomer is a compound of the formula:

$$C_3F_7O[CF(CF_3)CF_2O]_pCF=CF_2$$

wherein p is 1 or 2.

7. The process according to claim 2, wherein the comonomer is chlorotrifluoroethylene.

8. The process according to claim 2, wherein the comonomer is vinylidene fluoride.

9. The process according to claim 2, wherein the comonomer is trifluoroethylene.

10. The process according to claim 1, wherein the unsintered polytetrafluoroethylene powder is heated at a temperature in a range of from a temperature 50° C. lower than the melting point to a temperature just below the melting point.

11. The process according to claim 1, wherein the heating is carried out in an atmosphere of molecular fluorine, ClF, ClF₃, ClF₅, BrF, BrF₃, BrF₅, IF₃, IF₅, IF₇, XeF₂, XeF₄, XeF₆, KrF₂, NF₃, NF₂, N₂F₄, N₂F₂ or N₃F.

* * * * *